Jan. 15, 1924.

R. HILL 1,480,611

MEASURING MACHINE

Filed Jan. 2, 1920

Inventor
Reuben Hill.
By S. Jay Teller
Attorney

Patented Jan. 15, 1924.

1,480,611

UNITED STATES PATENT OFFICE.

REUBEN HILL, OF HARTFORD, CONNECTICUT, ASSIGNOR TO PRATT & WHITNEY COMPANY, OF NEW YORK, N. Y., A CORPORATION OF NEW JERSEY.

MEASURING MACHINE.

Application filed January 2, 1920. Serial No. 348,994.

*To all whom it may concern:*

Be it known that I, REUBEN HILL, a citizen of the United States, residing at Hartford, in the county of Hartford and State of Connecticut, have invented certain new and useful Improvements in Measuring Machines, of which the following is a specification.

This invention relates to measuring machines and especially to an attachment for measuring machines to measure diameters of threaded bodies.

The invention especially relates to a device which may be directly applied to a standard precision measuring machine for the purpose of determining the diameters of cylindrical bodies having screw-threads on their outer surfaces.

The principal object of the invention is to provide a device which may be conveniently clamped or secured to a precision measuring machine base so that it may have a limited free movement in the direction of the axis of the measuring machine plungers.

A further object of the invention is to provide a device for the above purpose including means for mounting a pair of centers which may be adjustably secured on a carriage so that the specimen may be mounted in any desired position.

A further object of the invention is to provide a carriage, or other device on which the specimen to be measured is mounted, with means for conveniently and adjustably supporting thread-engaging members.

A still further object of the invention is to provide a simple device which may be mounted on a precision measuring machine and which may be retained in position without disturbance to the operation of the machine while being used for its usual or ordinary measuring of plain linear dimensions.

In the accompanying drawings I have shown the embodiment of the invention which I now deem preferable but it is to be understood that changes and modifications may be made within the scope of the appended claims without departing from the spirit or scope of the invention as expressed in the appended claims.

In the drawings annexed hereto and forming a part of this specification:

Figure 1:
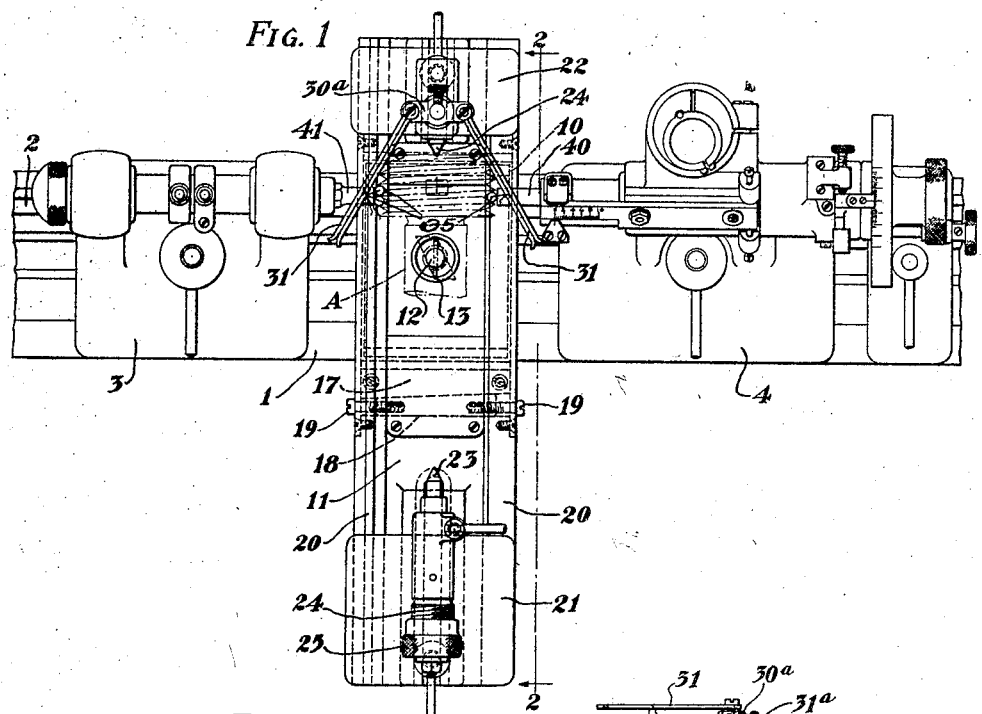
Figure 1 is a plan view of a standard form of precision measuring machine provided with the device made in accordance with the present invention.

As illustrated in the drawings, the embodiment of the invention in its entirety comprises the following principal parts, namely, first, a standard measuring machine, the one selected for illustration being of a well-known type having the usual bed, tailstock and headstock. Secondly, a carriage adjustably secured along the bed of the measuring machine. Third, a pair of centers adjustably secured on the carriage in order to mount the specimen to be measured. Fourth, means for flexibly suspending screw thread-engaging members on either side of the specimen in position to engage the threaded parts of the specimen.

Referring more particularly to the figures of the drawing, 1 refers to a base or bed of a standard precision measuring machine provided on its top surface with guideways 2 on which are adjustably secured a tailstock 3 and a headstock 4 in the usual manner. As these parts are well known and form no part of the present invention, further description of them is thought to be unnecessary.

Between the tailstock 3 and headstock 4 is mounted a support 10 for a specimen mounting carriage 11. This support 10 is adapted to be secured in adjusted position longitudinally along the base 1 by a screw 12 which may be tightened or loosened by means of a knurled nut 13. Along the front and rear edges of this support 10 are provided race-ways 15 adapted to provide a bearing for a number of balls 16 held therein between the ways 15 on the support 10 and corresponding ways 17 provided on the carriage 11.

Preferably, one of the ways 17 may be adjustably mounted on the carriage, as for instance, by means of a wedge member 18, Fig. 1, and brought to accurately adjusted position by means of cap screws or other adjusting means 19. This adjustable bearing 17 provides means for taking up wear as the balls 16 or race-ways become worn and it is essential to maintain the accuracy of the device as any twisting or other movement out of alinement of the carriage 11 would prevent precise measurements being taken. It will be seen that the provision of the wedge 18 permits the taking up of wear on both sets of balls 16 as well as on the corresponding race-ways on either side of the support 10.

Figure 2:
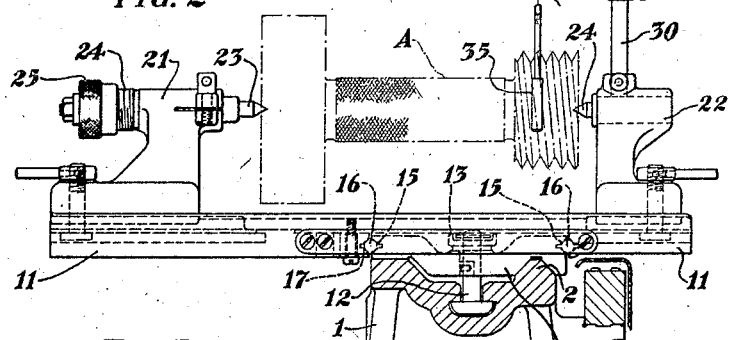
Fig. 2 is an elevational view taken on line 2—2 of Fig. 1.

Extending along the top surface of the carriage 11 is a dovetailed projection 20 on one side and a flat surface 20ª on the other side, these forming guide ways on which are slidably and adjustably mounted the center supporting pedestals 21 and 22, Fig. 2. The centers 23 and 24 are mounted in these pedestals 21 and 22 so that they are in alinement with each other and their common axis is at right angles to the axis of the measuring plungers 40 and 41 provided in tailstock and headstock 3 and 4. Preferably the axis of adjustable centers 23 and 24 and the axis of the measuring plungers lie in the same horizontal plane. Preferably, one of the centers such as 23 is provided for movement forwardly and rearwardly relative to its pedestal 21 by means of a screw and cap respectively 24 and 25. This particular construction of centers is, however, well known and a further description thereof is thought to be unnecessary. Suffice it to state that with pedestal 22 and its center 24 secured in any desired position by any suitable clamping means and with the pedestal 21 with its center 23 brought up approximately to adjusted position, pedestal 21 may be suitably clamped and then center 23 may be moved forwardly by means of the knurled cap 25 so that the centers 23 and 24 may engage orifices provided at either end of the specimen to be measured.

Figure 3:
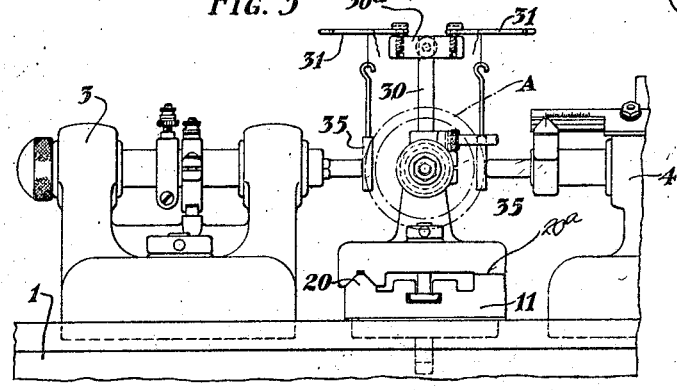
Fig. 3 is an elevational view showing a part of a measuring machine with the present device mounted thereon.

Conveniently mounted on the top surface of pedestal 22 a support 30, Figs. 2 and 3, is provided which preferably stands vertically on the pedestal 22 and, at its upper end, is provided with members 31. Preferably the members 31 are pivoted to a member 30ª adjustable up or down the support 30 and are adapted to be clamped thereto in any position by means of a screw 31ª. Members 31 as illustrated in the drawing are preferably in the form of flexible steel fingers providing means for supporting the threads or strings by means of which wires 35 are held in place. Preferably the members 31 may be made up of two leaf springs or of two spring rods held together by their own resiliency, as seen in Fig. 1, and permitting a thread or string to be inserted between them, the resiliency being sufficient to hold the wires 35 in supported position to engage the screw threads being measured.

It will be seen that the construction above described provides convenient means for flexibly and adjustably supporting the wires 35 in a manner which will permit ready adjustment for different diametered bodies being measured and also in a manner preventing straining or bending the wires 35 while they are being used in measuring.

The wires 35 are preferably cylindrical in those portions which engage the threaded sections of the specimen and the measuring plungers 40 and 41. These contact with opposite sides of the threads in the specimen and also are in line contact with the contacting surfaces of the measuring plungers or anvils 40 and 41. Any desired diameters of rods or wires 35 may be used so long as they contact with opposite sides of the threaded portion and will engage the anvils. Preferably, in testing a specimen, I use two or more different sizes so that the points of contact of the wires on the threaded portions will be on different parts of the threads, the wires at any one reading being equal.

Coming now to a description of the method of operation of the above device and its use in connection with the parts of a standard measuring machine, a specimen such as shown at A in the figures is mounted as shown in Fig. 2 between the centers 23 and 24. The pedestals 21 and 22 are then adjusted forwardly or backwardly so that the threaded portion of the specimen A to be measured is in alinement with the measuring plungers. Thread-engaging wires 35 are then suspended by means of threads engaging the members 31 so that when adjusted there is one of these members engaging the sides of adjacent screw threads and adapted to contact with the measuring plunger 40 on the measuring head 4. At the other side of the specimen, two wires are provided suspended from the member 31 and engaging adjacent threads of the specimen A, these latter thread-engaging wires 35 being in positions to be engaged by the anvil 41 provided on tailstock 3. The position of the support 10 is then varied if necessary so that with the measuring plunger 40 brought up into position, a slight amount of free movement of the carriage 11 and specimen A along the bed is permitted. By reason of the fact that the balls 16 permit free adjustment of carriage 11, any movement given the measuring head plunger 40 against one side of the specimen will move the latter together with the carriage 11 with a minimum of friction until the opposite side of the specimen, or a wire contacting with the same, is engaged by the anvil 41. This permits the measuring plunger 40 to be carefully adjusted with the same precision obtainable when measuring cylindrical bodies as in the ordinary use of the measuring machine.

What I claim is:

1. A device for measuring diameters of threaded bodies adapted to be applied to a measuring machine, comprising in combination, a carriage, a support for said carriage, means for adjustably attaching said support to a part of the measuring machine, ball bearing means between said carriage and support permitting a limited amount of free movement between said support and carriage, and means for adjustably mounting a specimen to be measured on said carriage in measuring position.

2. A device for measuring diameters of threaded bodies adapted to be applied to a measuring machine, comprising in combination, a carriage, a support for said carriage, means for adjustably attaching said support along the base of the measuring machine, ball bearing means between said carriage and support permitting a limited free movement between said support and carriage and means for adjustably mounting a specimen to be measured on said carriage in measuring position.

3. A device for measuring diameters of threaded bodies adapted to be applied to a measuring machine having aligned anvils extending parallel with its base, comprising in combination, a carriage, a support for said carriage, means for adjustably attaching said support to a part of the measuring machine, ball bearing means between said carriage and support permitting a limited free movement between said support and carriage in a direction parallel to said anvils and means for adjustably mounting a specimen to be measured on said carriage in measuring position.

4. A device for measuring diameters of threaded bodies adapted to be applied to a measuring machine, comprising in combination, a carriage, a support for said carriage, means for adjustably attaching said support to a part of the measuring machine, ball bearing means between said carriage and support permitting a limited free movement between said support and carriage and means comprising a pair of centers for adjustably mounting a specimen to be measured on said carriage in measuring position.

5. In a device adapted to determine the diameters of threaded bodies, in combination, a carriage, means for mounting a specimen thereon, and resilient means to flexibly suspend thread-engaging members in position for engagement with the screw threads on opposite sides of the specimen being measured.

6. In a device adapted to determine the diameters of threaded bodies, in combination, a carriage, means for mounting a specimen thereon, pivoted resilient holding means to flexibly suspend screw thread-engaging members in position for engagement with opposite sides of the screw threads on the specimen being measured.

7. In a device adapted to determine the diameters of threaded bodies, in combination, a carriage, means for mounting a specimen thereon, and adjustable pivoted holders to flexibly suspend screw thread-engaging members in position for engagement with opposite sides of the screw threads on the specimen being measured.

8. In a device adapted to determine the diameters of threaded bodies, in combination, a carriage, means for mounting a specimen thereon, and a pair of pivoted horizontal holders to flexibly suspend screw thread-engaging members in position for engagement with opposite sides of the screw threads on the specimen being measured.

9. In a device adapted to determine the diameters of threaded bodies, in combination, a carriage, means for mounting a specimen thereon, and a pair of adjustable pivoted holders on the carriage to flexibly suspend screw thread-engaging members in position for engagement with opposite sides of the screw threads on the specimen being measured.

10. In a device adapted to determine the diameters of threaded bodies, comprising in combination, a carriage having a work support thereon, means for mounting a specimen thereon, and vertically adjustable holders pivoted to said work support to suspend screw thread-engaging members in position for engagement with opposite sides of the screw threads on the specimen being measured.

11. A device adapted to cooperate with a measuring machine to determine the diameters of threaded bodies, comprising in combination, a carriage mounted on a part of the measuring machine, and having a work support thereon said carriage having independently adjustable means for mounting the specimen to be measured and having screw thread-engaging members depending from adjustable pivoted members mounted on said work support.

12. A device adapted to cooperate with a measuring machine to determine the diameters of threaded bodies, comprising in combination, a carriage, means for mounting a specimen thereon, means to flexibly support thread-engaging members, and means adjustably connecting said carriage with a part of the measuring machine.

13. A measuring machine, comprising in combination, a base, a pair of measuring plungers, a mounting for a specimen to be measured, said mounting comprising a carriage freely movable a limited distance relative to said base, and a pair of transversely adjustable centers mounted on said carriage and adapted to support the specimen.

14. A measuring machine adapted to measure the diameter of threaded bodies comprising in combination, a base, a headstock and tailstock thereon, aligned measuring plungers mounted therein adapted to move toward or away from each other, a support on said base, a carriage on said support movable in a direction parallel to said plungers, and adjustable specimen mounting means on said carriage adapted to hold said specimen transversely to said plungers.

15. A measuring machine adapted to measure the diameter of threaded bodies comprising in combination, a base, a headstock and tailstock thereon, aligned measuring plungers mounted therein adapted to move toward or away from each other, a support on said base, a carriage on said support movable in a direction parallel to said plungers, adjustable specimen mounting means on said carriage adapted to hold said specimen transversely to said plungers, and members supported above said specimen adapted to engage the specimen and plungers on opposite sides of said specimen.

In testimony whereof, I hereto affix my signature.

REUBEN HILL.